Figure 2:
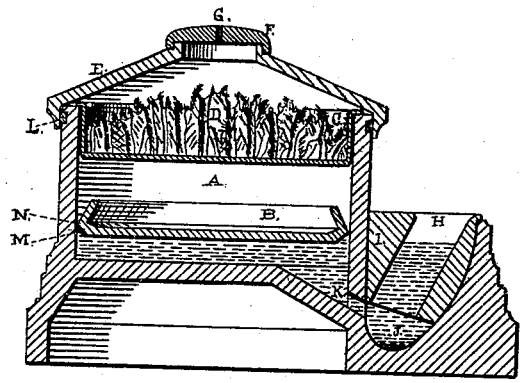

S. DARLING.
Inkstand.

No. 169,152.

Patented Oct. 26, 1875.

WITNESSES,
Joseph H. Lewis
S. R. Burleigh

INVENTOR
Samuel Darling

UNITED STATES PATENT OFFICE.

SAMUEL DARLING, OF PROVIDENCE, RHODE ISLAND.

IMPROVEMENT IN INKSTANDS.

Specification forming part of Letters Patent No. 169,152, dated October 26, 1875; application filed June 17, 1875.

*To all whom it may concern:*

Be it known that I, SAMUEL DARLING, of the city of Providence and State of Rhode Island, have invented certain Improvements in Inkstands; and I do hereby declare that the following, taken in connection with the drawing which accompanies and forms part of this specification, is a description of my invention sufficient to enable those skilled in the art to practice it.

My improvements consist in making an inkstand with a broad deep ink-reservoir, a removable top full size of the reservoir, a rubber cover that floats on the ink, a vessel in the upper part of the reservoir over the ink to contain water, or a sponge filled with water, and a dipping-cup outside of the reservoir, all hereinafter more fully described and set forth.

I illustrate, in the following drawing, one form of an inkstand containing my improvements, in which—

Figure 1:
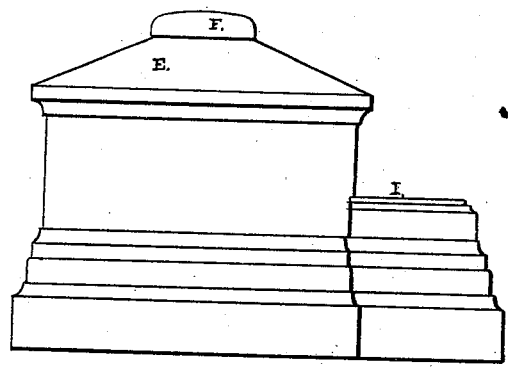
Figure 3:
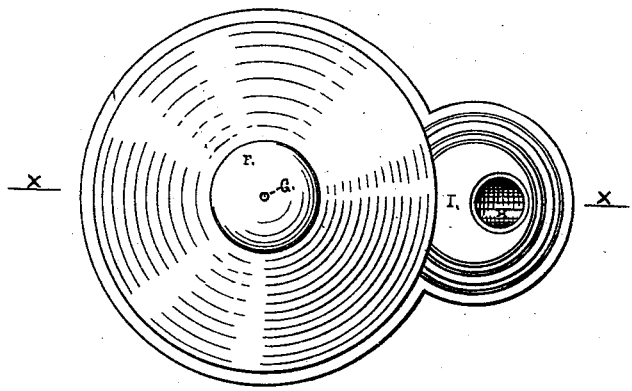

Figure 1 represents a side elevation; Fig. 2, a vertical section through line $x\,x$, Fig. 3; Fig. 3, a plan view.

A in the drawing is the ink-reservoir; B, the rubber floating cover; C, the dish or vessel that holds the water or sponge; D, the sponge; E, the removable top; F, a small cap; G, a vent-hole in the cap; H, the dipping-cup; I, piece containing the dipping-cup, which is to be put in with rubber packing or cement; J, cavity for sediment; K, hole for passage of ink into the dipping-cup from the reservoir; L, rubber band to hold on the top.

I preferably make my inkstand of colored glass or some other suitable opaque material, so that the internal apparatus will not be in view. The reservoir A is made broad, so that the ink will not be lowered rapidly by use. The top is made removable, so that the reservoir can be easily cleansed. The sediment from some inks is very sticky and difficult to remove from the surface of the glass, but with such an arrangement as this it can be easily done. When there is a broad surface of ink exposed to the atmosphere it evaporates very fast, and to prevent such evaporation, and to preserve the ink in as limpid a state as possible, I place upon the ink a thin float of rubber, B, which nearly covers the whole surface of ink, and keeps the air entirely from what it does cover. This rubber is made in dish form, with the sides turned in to prevent the ink from running over into it in the ordinary moving of the inkstand, and to prevent it from sticking to the sides of the reservoir. Some rubber, being heavier than the ink, will sink somewhat, and to prevent the ink from flowing up on the sides I bevel the corner, as shown at M, so that the rubber will float before the ink rises above the bevel. The sharp edge N, being above the ink, and having so little bearing on the walls of the reservoir, will not be likely to stick to the walls. The rubber float is to be made a little smaller than the reservoir, that it may always be sure to follow the ink. To prevent the evaporation of the ink which the rubber does not cover, and to keep the air in the reservoir moist, so that it will not take in more moisture, and thus dry the ink which is exposed around the edges of the rubber float, I place a vessel, C, in the upper part of the reservoir, and fill it with water or a sponge filled with water. The air in the upper part of the reservoir being thus kept filled with water, the evaporation of the ink below will be very slight. The vessel C will not fit so tightly as to prevent the free passage of air from the lower part of the reservoir into the upper, and through the vent G, that the ink may stand at its natural level.

When a plunger is used to raise the ink, as in Patent No. 160,171, to applicant, the float is dispensed with, as the plunger takes the place of it, and the dish for holding the water or sponge will be in the top of the plunger, the plunger performing the use of the rubber float as to the evaporation of the ink.

A sponge, wet or filled with water, may be put in the upper part of the reservoir without the containing-vessel c, and held by friction or any other convenient manner.

For convenience in dipping I make the dipping-cup to stand at an angle, and, as it cannot be pressed with the reservoir, I press it in a separate piece, I, which is to be cemented in or put in with rubber packing. J is a recess under the dipping-cup for sediment. The rubber ring L is for packing the top E and making it air-tight, and also for holding it on sufficiently.

Having thus fully described my improvement, it will be seen that it will be particularly valuable on account of the facility with which it can be cleansed and the device to prevent evaporation.

What I claim as new, and desire to secure by Letters Patent, is—

The combination, in an inkstand, of an ink-reservoir, a vessel in the upper part thereof to contain water or a wet sponge, and a removable top, substantially as described, and for the purpose set forth.

SAMUEL DARLING.

Witnesses:
JOHN E. HALL,
JOHN T. CRAMSHAW.